Jan. 30, 1945. A. J. CHARNOCK 2,368,611
RETAINING MEANS FOR LINK PINS IN TRACKS FOR TRACK-LAYING
VEHICLES AND FOR LIKE PURPOSES
Filed July 12, 1943

Inventor
Andrew John CHARNOCK
By
Attorney

Patented Jan. 30, 1945

2,368,611

UNITED STATES PATENT OFFICE 2,368,611

RETAINING MEANS FOR LINK PINS IN TRACKS FOR TRACK-LAYING VEHICLES AND FOR LIKE PURPOSES

Andrew John Charnock, Leyland, England, assignor to Leyland Motors Limited, Kingston on Thames, England, a company of Great Britain Application July 12, 1943, Serial No. 494,408
In Great Britain May 15, 1942

7 Claims. (Cl. 287—119)

This invention is a means for retaining journals in their bearings against longitudinal movement and protecting them from ingress of dust or water.

The invention is particularly applicable to the retention in their sockets of the pins which hinge together the intermeshing ends of adjacent links of the track of a track-laying vehicle. This is an instance of a journal in which prevention of longitudinal movement is important and difficult, and in which protection from water, mud and dust is particularly needed in view of the severe conditions to which the hinge joint is exposed in use. The invention is however also applicable generally to the retention of pivot or hinge pins in engines and machines and to kindred uses such as the retention of shafts against longitudinal movement in their bearings; for instance to the endwise location of the cam-shaft of an internal combustion engine.

The invention consists in the combination with the pin or shaft journal and its socket or bearing, the latter having an annular recess or groove of V or other section adjacent the desired position of the end of the journal, of a plug of rubber or like resilient material (herein referred to as rubber) of a diameter to fill the end of the socket or bearing and having a collar of a shape and size to fill the annular recess, the plug being of such size or form that the collar can be compressed or otherwise deformed to pass into the socket or bearing and expand into the annular recess.

The end of the plug which contacts with the pin or shaft journal should be faced with metal, the surface of which may be rounded to a large radius to diminish the area of contact.

A solid plug big enough to fill the bore of the link socket or bearing will be capable of sufficient compression and distortion to permit the collar to be contracted within the diameter of the bore. Alternatively, the plug may have a metal core, and the rubber be reduced to a sleeve, engaged with the core so that endwise displacement is prevented. The depth of rubber may then be insufficient to allow the requisite deformation, and a gap may be left between the rubber and the core near the collar on the sleeve, for instance by making the collar a corrugation or providing a groove in the sleeve opposite the collar, to facilitate the distortion necessary to get the plug into position within the bore.

In cases where retention of oil in the bearing is an important function of the journal retainer the resilient material should be an oil-resistant rubber substitute or synthetic rubber such as the material known under the trade-mark neoprene.

The invention is illustrated in the accompanying drawing in its application to the retaining of track link pins.

Figure 1:
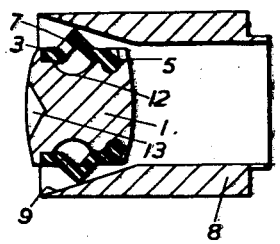
Figures 1, 2 and 3 illustrate one construction of retainer, Figures 1 and 2 also showing the tool employed to put the retainer in place, Figure 2 showing the tool in use for inserting the retainer in a track link, and Figure 3 showing the retainer in position in the link.
Figure 2:
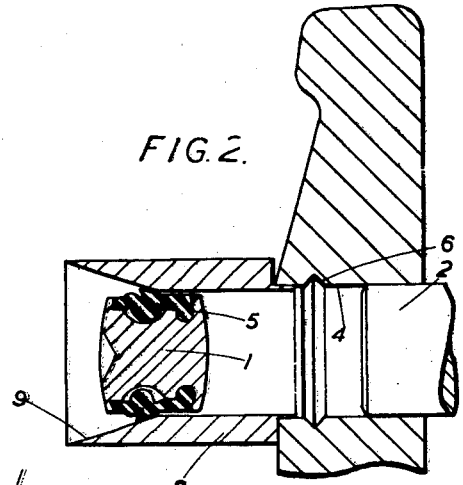
Figure 3:
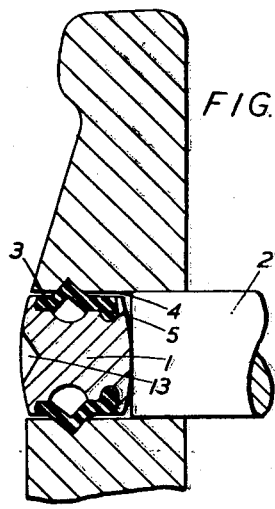

In the form shown in Figures 1 to 3, the retainer has a substantial metal core 1, the inner face of which is slightly rounded to contact with the link pin 2 over a small area only. Upon this core is a sleeve of rubber 3, the sleeve and core being engaged one with the other to prevent relative endwise movement; in the construction shown the ends of the core are nearly of the full diameter of the link socket 4, and may be undercut, and the rubber sleeve is located between them; in addition the sleeve has an internal collar 5 engaging in a groove in the core; the sleeve may also be vulcanized to the core.

To engage the V groove 6 in the link socket 4 the rubber sleeve 3 has a collar 7 of similar cross section to the groove, which therefore projects beyond the diameter of the socket 4.

To put the plug in position in the link socket, a tool 8 is provided of the form shown in Figures 1 and 2. It is a metal sleeve, the internal diameter of which is a little less than the diameter of the socket 4. The bore of the sleeve is flared at one end as seen at 9, to or beyond the diameter of the collar 7. At the other end, 11, the external diameter of the sleeve is reduced to make it a sliding fit in the socket 4. The retaining plug is put in the flared end of the tool as seen in Figure 1, and the tool is then inserted in the socket as seen in Figure 2. Pressure is then exerted upon the plug to force it through the tool into the socket. To admit of this the collar 7 must be compressed and deformed to lie within the diameter of the tool and socket. The rubber not being very thick in the radial direction could not yield sufficiently for this purpose with the collar solid. It is made more yielding by forming the collar 7 as a corrugation in the sleeve instead of as a projection only. Instead, or in addition, an annular recess 12 may be formed in the core 1 in the neighbourhood of the collar 7 so affording a space into which the rubber can be deformed for instance as appears in Figure 2.

When the plug is in position only the centre of the core 1 contacts with the track link pin 2 as seen in Figure 3 so that there is little tendency to turn the plug. Endwise pressure of the pin 2 upon the plug will compress the rubber sleeve and tend to press it the more firmly into the groove 6. The formation of the collar 7 as a corrugation ensures that endwise pressure of the pin is converted into outward pressure of the rubber upon the V groove.

Should it become necessary to remove the plug this may be done by the aid of a stirrup with a thrust screw in it. The stirrup is engaged with the track link and the end of the screw is located by the countersink 13 in the end of the core 1.

On the vehicles of heavy type more considerable forces may be encountered tending to displace the link hinge pin, and the retaining means is therefore made less easily deformable. Generally speaking this may be done by increasing the thickness of the sleeve and correspondingly diminishing the diameter of the core. It then becomes unnecessary to leave any hollow space within the sleeve or core, the greater thickness of rubber being sufficiently deformable to render such space unnecessary.

Figure 4:
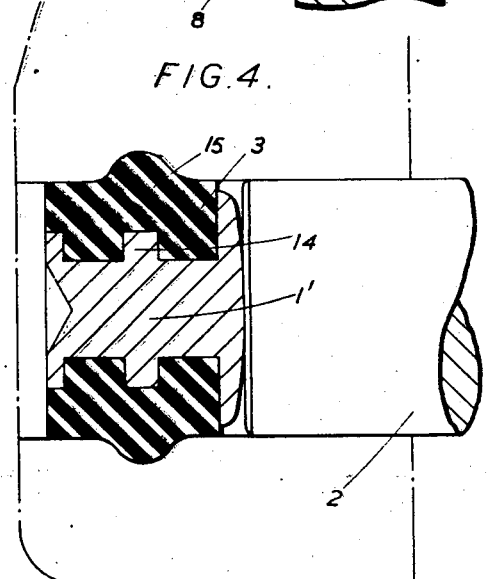
Figures 4, 5, 6 and 7 illustrate other constructions of retainer.

One example of this is seen in Fig. 4 where the core 1' is of considerably less diameter than in Figures 1 to 3 relatively to the diameter of the link socket, save at its inner end which is cambered as and for the reason above explained. The enlarged ends of the core and a collar 14 in the middle of it sufficiently engage the thickened sleeve 3 with the core to prevent lengthwise displacement. The collar 15 upon the sleeve 3 is in this instance of rounded cross section corresponding to the form of groove in the link socket. There is no hollow space beneath it because the rubber is of sufficient depth to admit of the distortion necessary to get the retainer into place.

Figure 5:
Figure 6:
Figure 7:
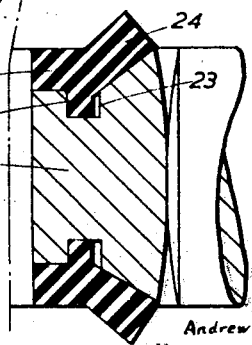

In Figure 5 a construction of retainer is shown which has no core at all but only an end plate 16 vulcanized to the inner face of the solid rubber plug 17. To afford the maximum length of bearing of the track link pin in its socket the construction may be modified as shown in Figure 6 where the simplified end plate 16 is closely adjacent to the collar 18.

Where a core is employed it is not essential that the rubber sleeve should exhibit an outwardly projecting collar when unstrained. A portion of it may be made to project by the placing of the sleeve upon the core. This is illustrated in Fig. 7 where the core 19 is conically expanded at its inner end to practically the diameter of the link socket. The rubber sleeve 21 is pressed on to the core until its inwardly projecting collar 22 engages in the groove 23 in the core, while its inner end 24 is splayed out by the coned part of the core. It is thus made to present a rib 24 of V section very much as in Figs. 1 to 3.

However, the sleeve 21 may be initially moulded in the form shown in Figure 4.

I claim:

1. Means for retaining a journal in a bearing comprising in combination with a bearing having an annular groove on its inner surface adjacent the end of the journal, a rubber plug of a diameter to fill tightly the end of the bearing, said plug having a collar of a shape and size to fill the annular groove and being deformable to permit the collar to be compressed within the bore of the bearing to allow of the plug being brought to a position within the bearing in which its collar registers with and expands into the groove in the bearing.

2. Journal retaining means according to claim 1 having a rounded metal surface at the inner end of the rubber plug to contact with the end of the journal.

3. Means for retaining a journal in a bearing comprising in combination with a bearing having an annular recess in its inner surface adjacent the end of the journal, a metal core of at least two different diameters, and a rubber sleeve fitting upon said core and into its part of lesser diameter and thereby hindered from axial displacement along said core, said sleeve having a collar of a size and shape to fill the annular recess in the bearing and capable of distortion sufficient to permit forcible entry of core and sleeve into the bearing.

4. Journal retaining means as claimed in claim 3 having the inner end of the metal core rounded to make only central contact with the journal end.

5. Journal retaining means as claimed in claim 3 wherein the collar on the rubber sleeve is hollow to permit of its distortion as claimed.

6. Journal retaining means as claimed in claim 3 wherein the core is recessed adjacent to the collar on the rubber sleeve to permit of the rubber being deformed into said recess and of the collar being thereby temporarily reduced to the diameter of the journal.

7. Means for retaining a journal in a bearing comprising in combination with a bearing having an annular recess in its inner surface adjacent the end of the journal, a metal core of less diameter than said journal having a median portion of still smaller diameter and an inner portion increasing in diameter towards its end to nearly the diameter of said journal, and a rubber sleeve fitting upon said core, having an inner rib engaging with said median portion of said core to prevent displacement along the core, and extending along said expanding inner portion of said core so that its edge projects beyond the diameter of said journal to the extent and in the position to enable it to enter and fill the annular recess in said bearing.

ANDREW JOHN CHARNOCK.